Figure 8:
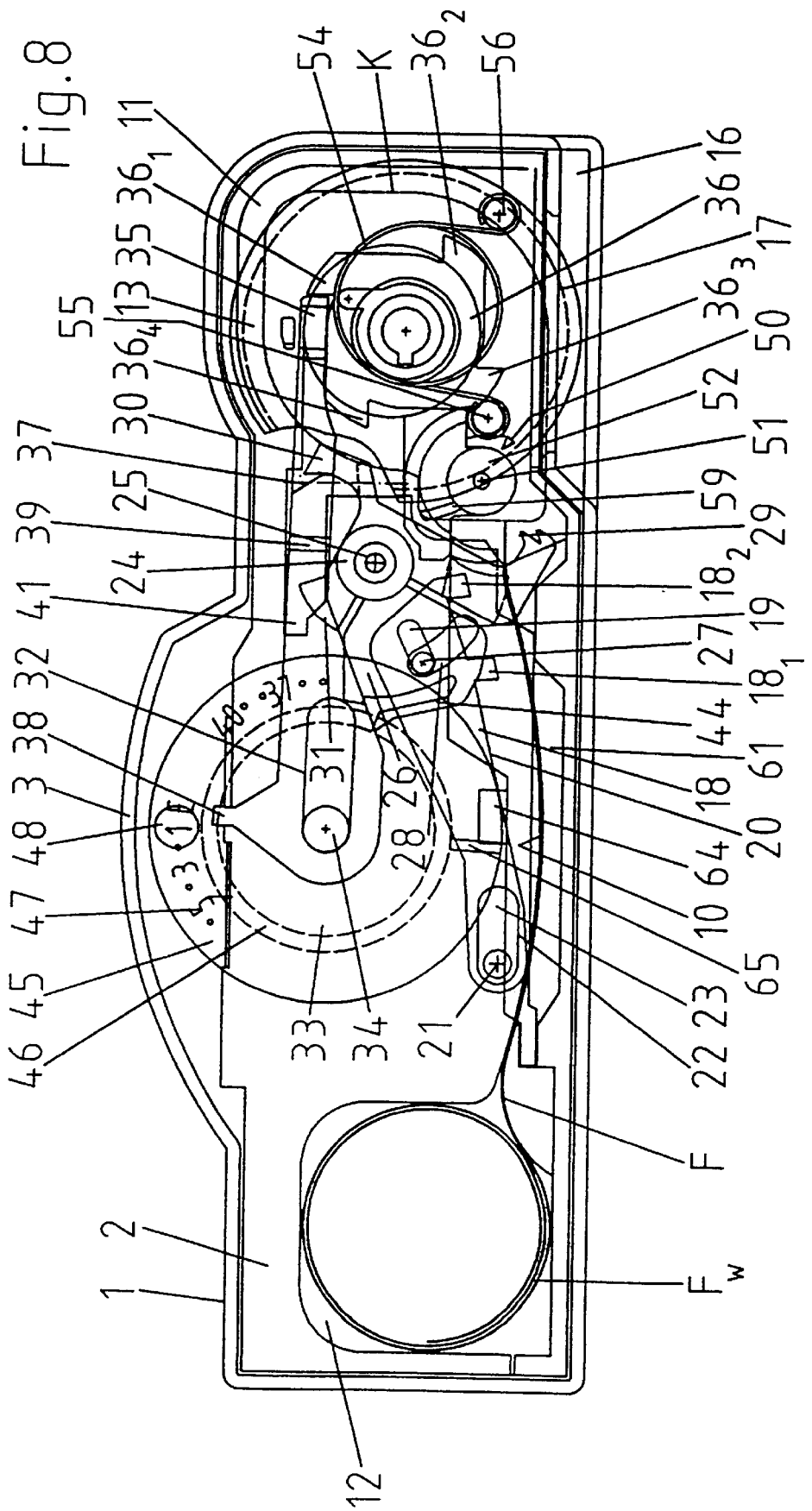

United States Patent [19]
Schröder et al.

[11] Patent Number: 5,899,590
[45] Date of Patent: *May 4, 1999

[54] PHOTOGRAPHIC RECORDING OR REPRODUCING DEVICE WITH FRAME-BY-FRAME FILM TRANSPORT

[75] Inventors: Rolf Schröder, Pöring; Claus Steiner, Mindelheim, both of Germany

[73] Assignee: AGFA Gevaert Aktiengesellschaft, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/845,332

[22] Filed: Apr. 25, 1997

[30] Foreign Application Priority Data

May 3, 1996 [DE] Germany .............. 196 17 766

[51] Int. Cl.$^6$ ...................................... G03B 1/00
[52] U.S. Cl. .................. 396/395; 396/397; 396/400; 396/411
[58] Field of Search .................. 396/395, 396, 396/397, 398, 399, 400, 401, 411, 416

[56] References Cited

U.S. PATENT DOCUMENTS

| | | | |
|---|---|---|---|
| 3,768,389 | 10/1973 | Ettischer et al. | 396/399 |
| 3,868,708 | 2/1975 | Winkler et al. | 396/400 |
| 3,918,074 | 11/1975 | Hackenberg et al. | 396/399 |
| 4,001,849 | 1/1977 | Takahashi | 396/395 |
| 4,106,041 | 8/1978 | Lange | 396/401 |
| 5,555,053 | 9/1996 | Stephenson, III | 396/399 |

*Primary Examiner*—Eddie C. Lee
*Attorney, Agent, or Firm*—Connolly & Hutz

[57] ABSTRACT

The invention relates to a photographic recording or reproducing device, preferably a camera, with a transportation device for the frame-by-frame transportation of a film along a film transportation path and with a film measuring device with an engagement member rotatable about an axis for engaging in perforation holes of a peripheral perforation of the film, the film transportation device being locked when the film reaches a position during its transportation which is provided for the recording or reproduction of an image, and the engagement member comprising an advancing engagement element in relation to its rotational movement and a trailing support element and being adjustable transversely to the film transportation path as a function of the abutment of the support element upon a surface extending parallel to the film transportation path. In addition, the photographic recording or reproducing device comprises a transportation device for the frame-by-frame transportation of a film along a film transportation path and a film measuring device with a rotatably and displaceably mounted engagement member for engaging in a peripheral perforation of a film, the film transportation device being locked by means of a locking device when the film reaches a position during its transportation which is provided for the recording or reproduction of an image, the locking device 29 of the measuring device being controllable by a drive device 50 for a sealing member of a film cassette K inserted in the device.

13 Claims, 13 Drawing Sheets

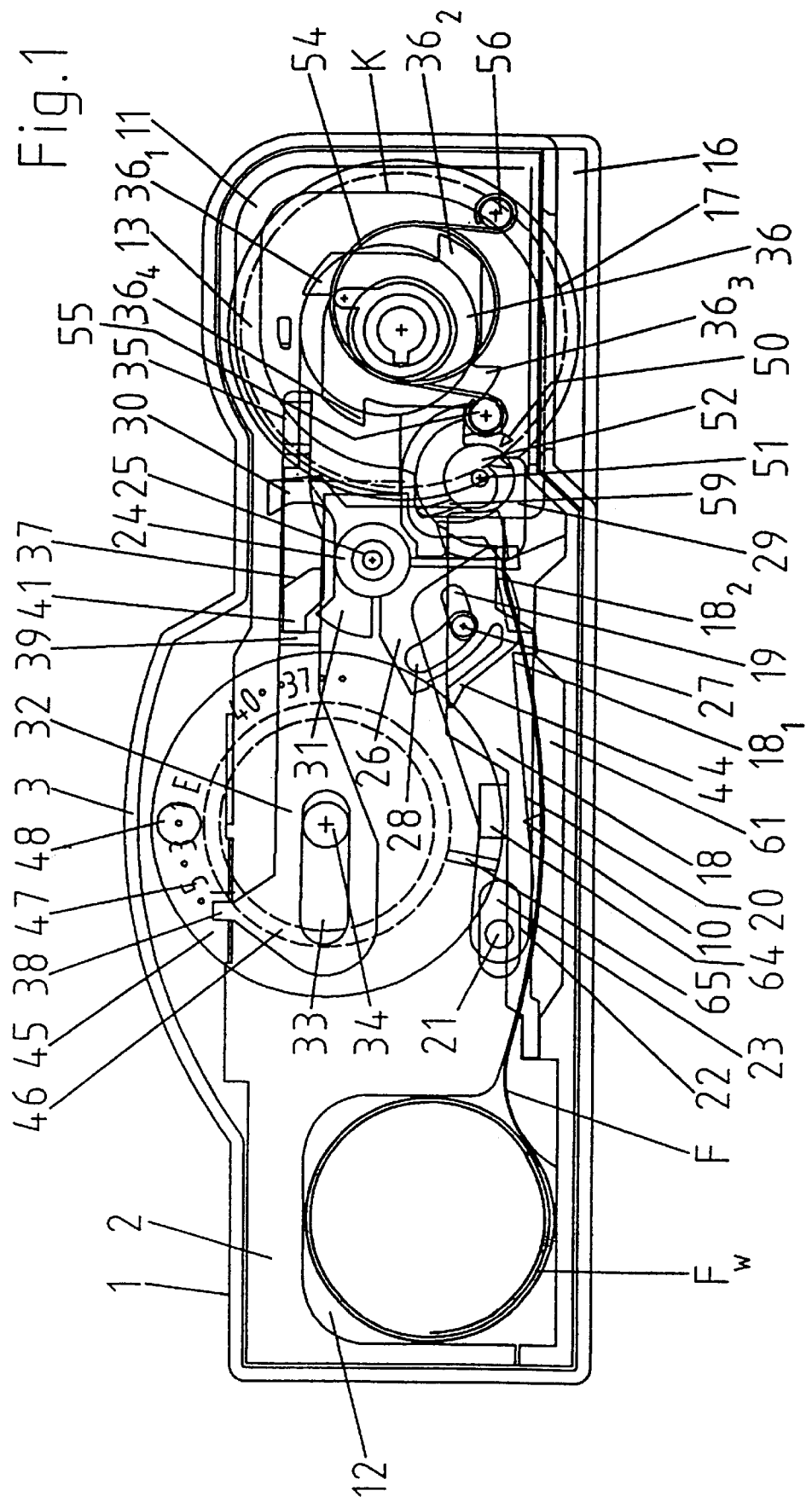

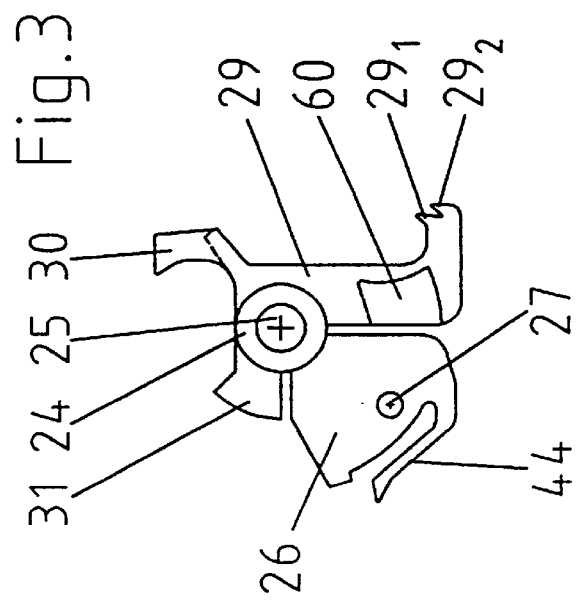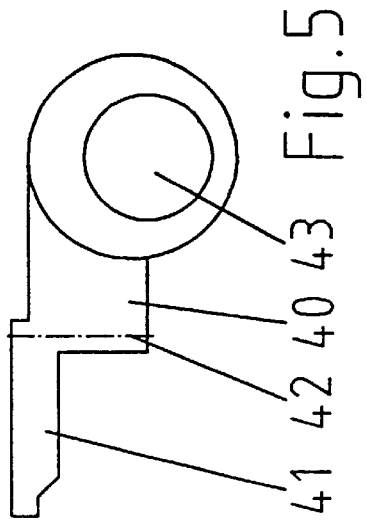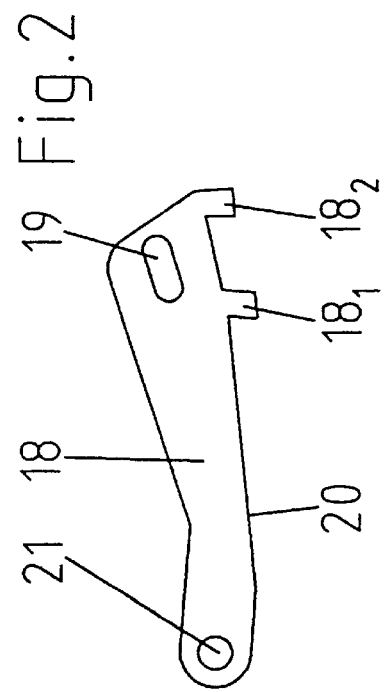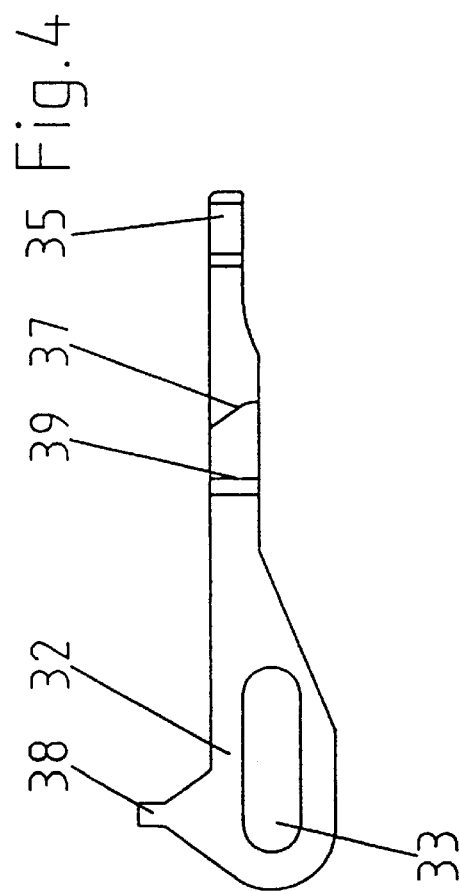

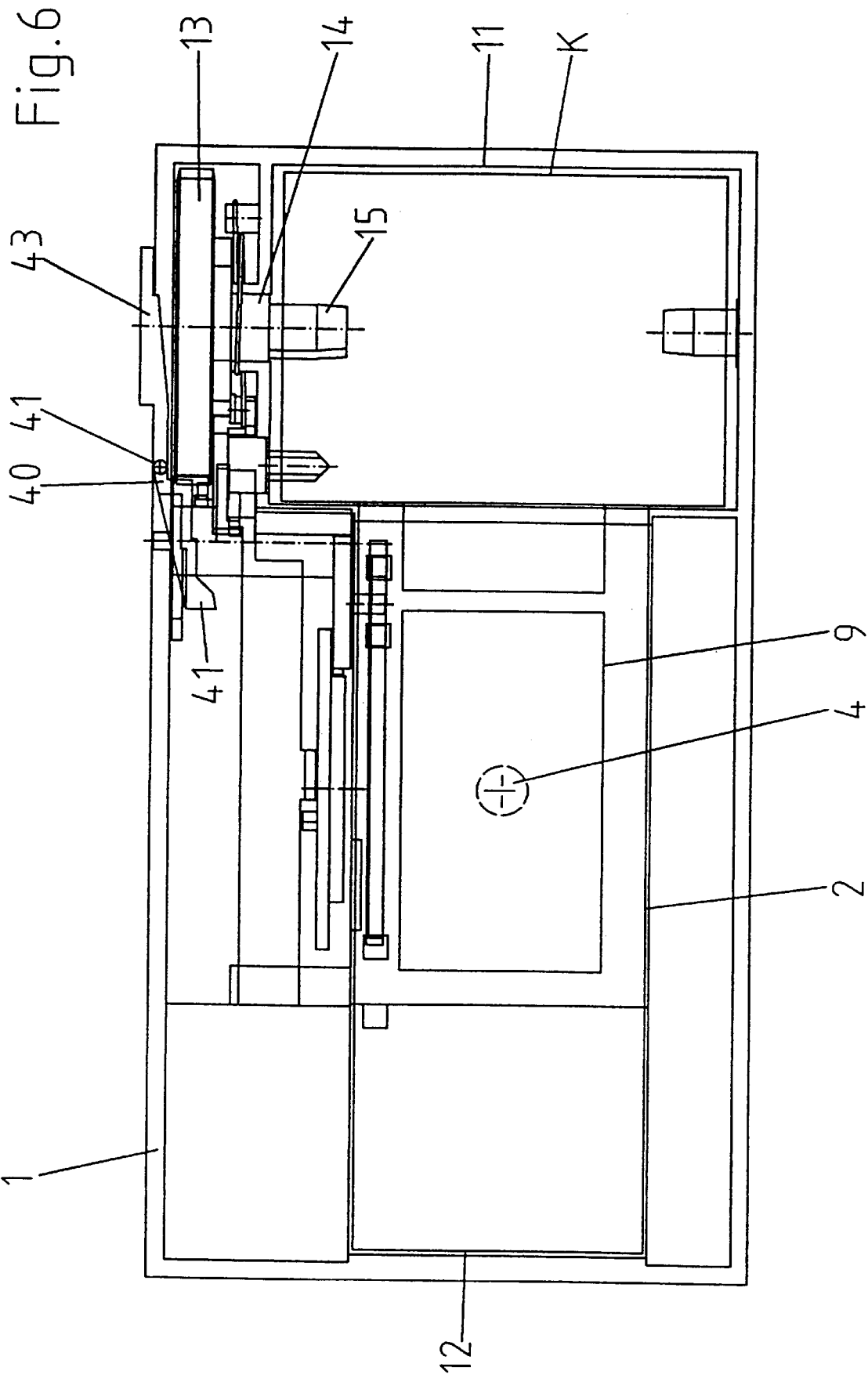

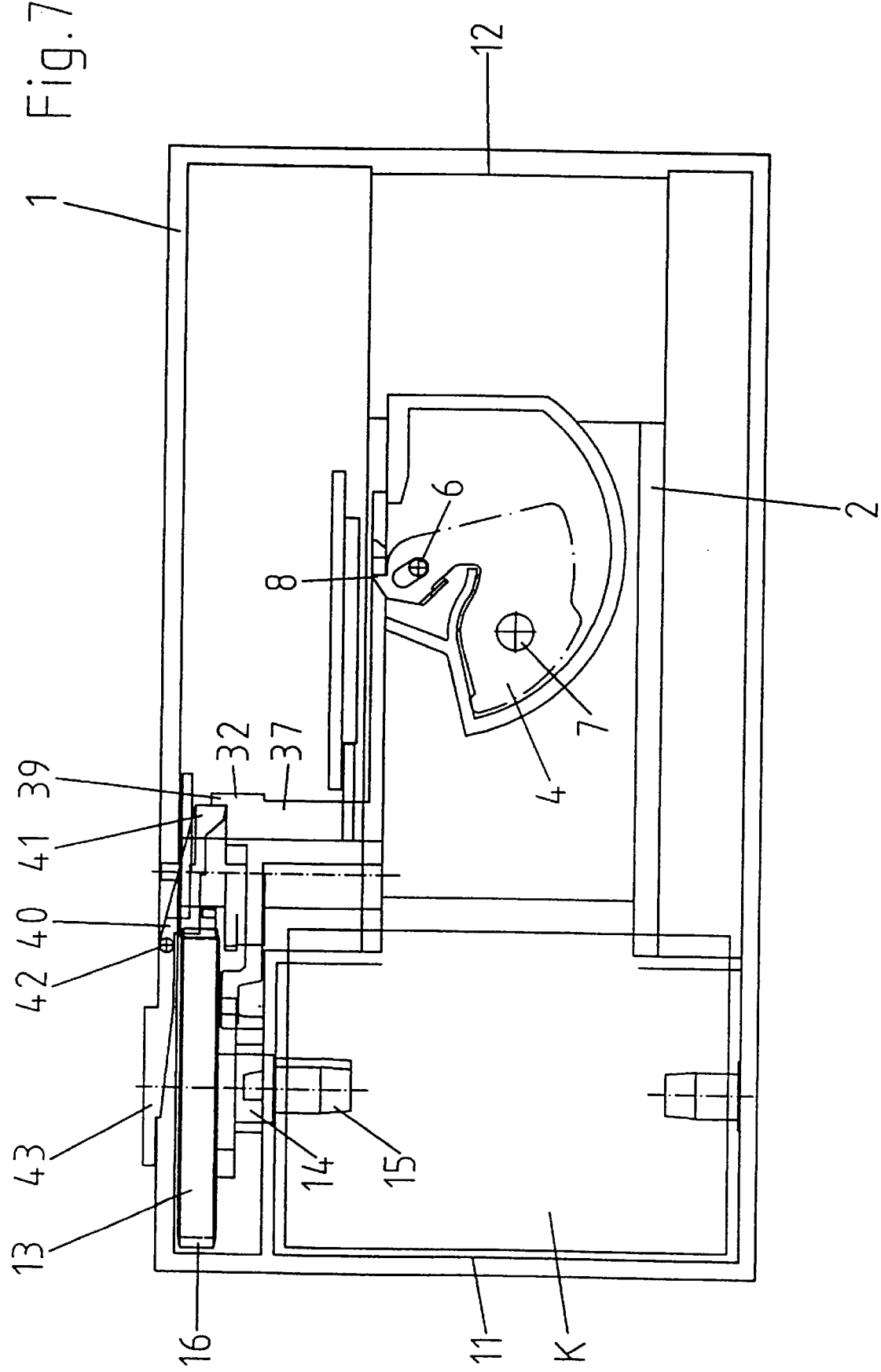

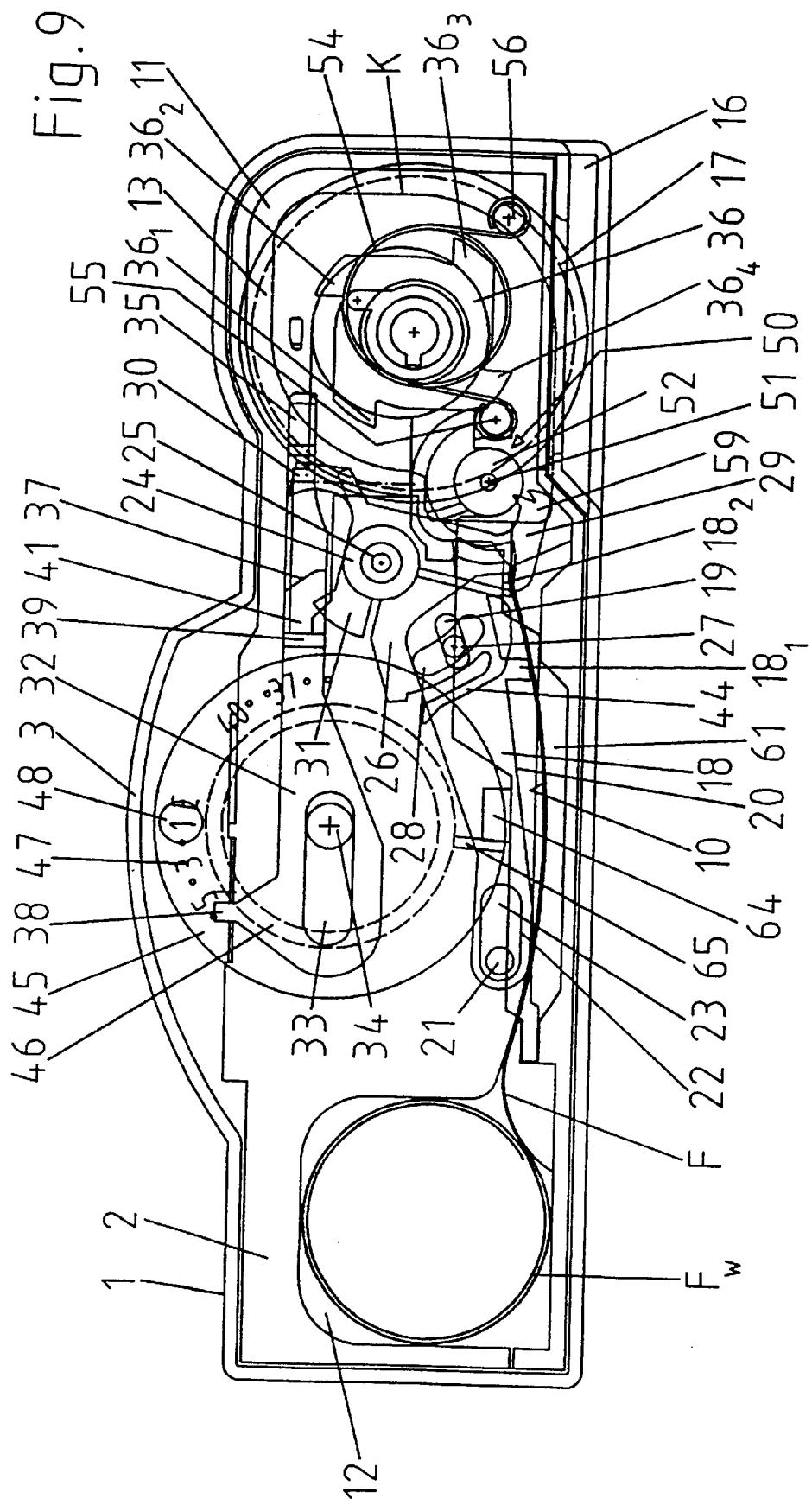

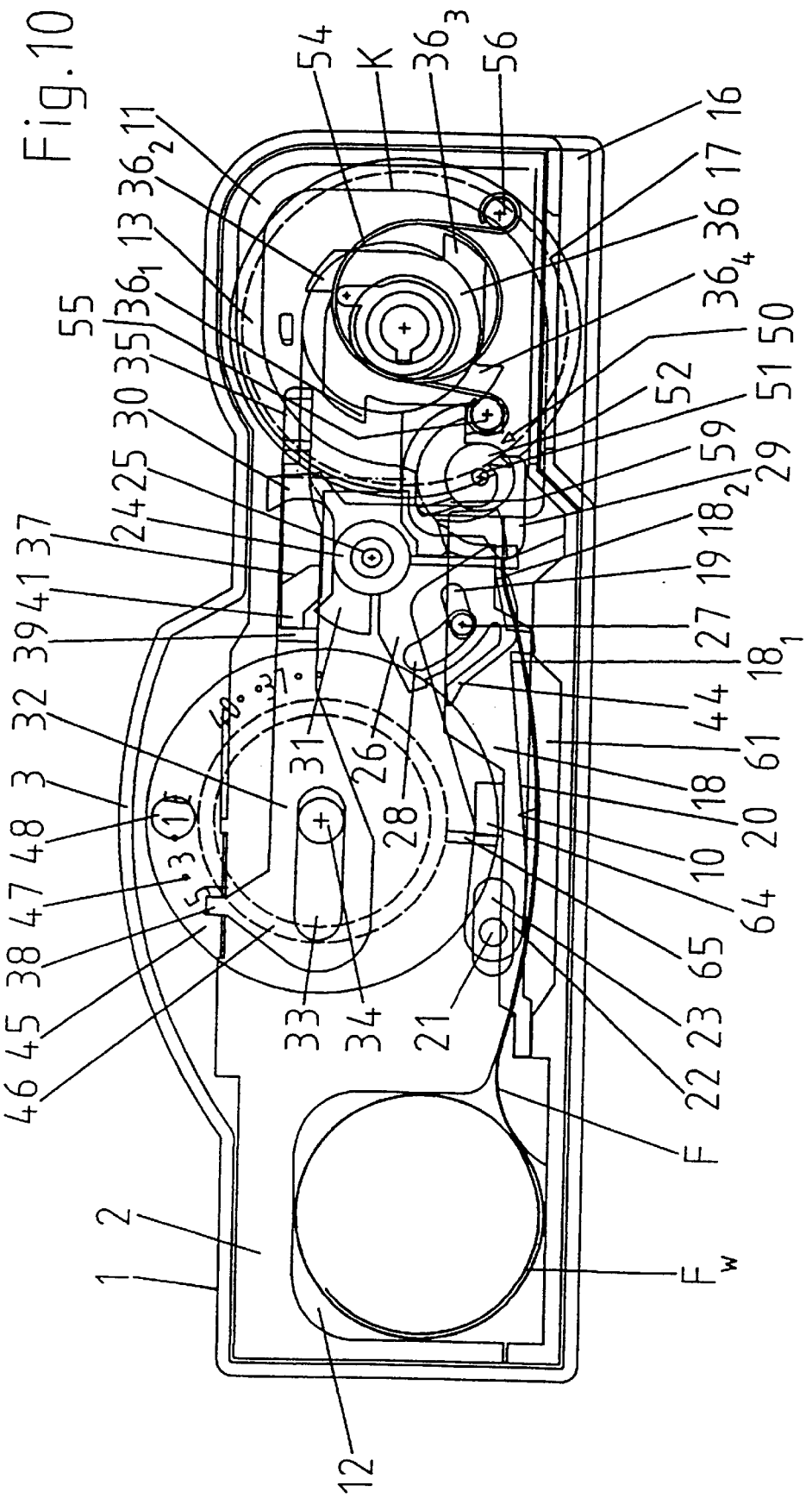

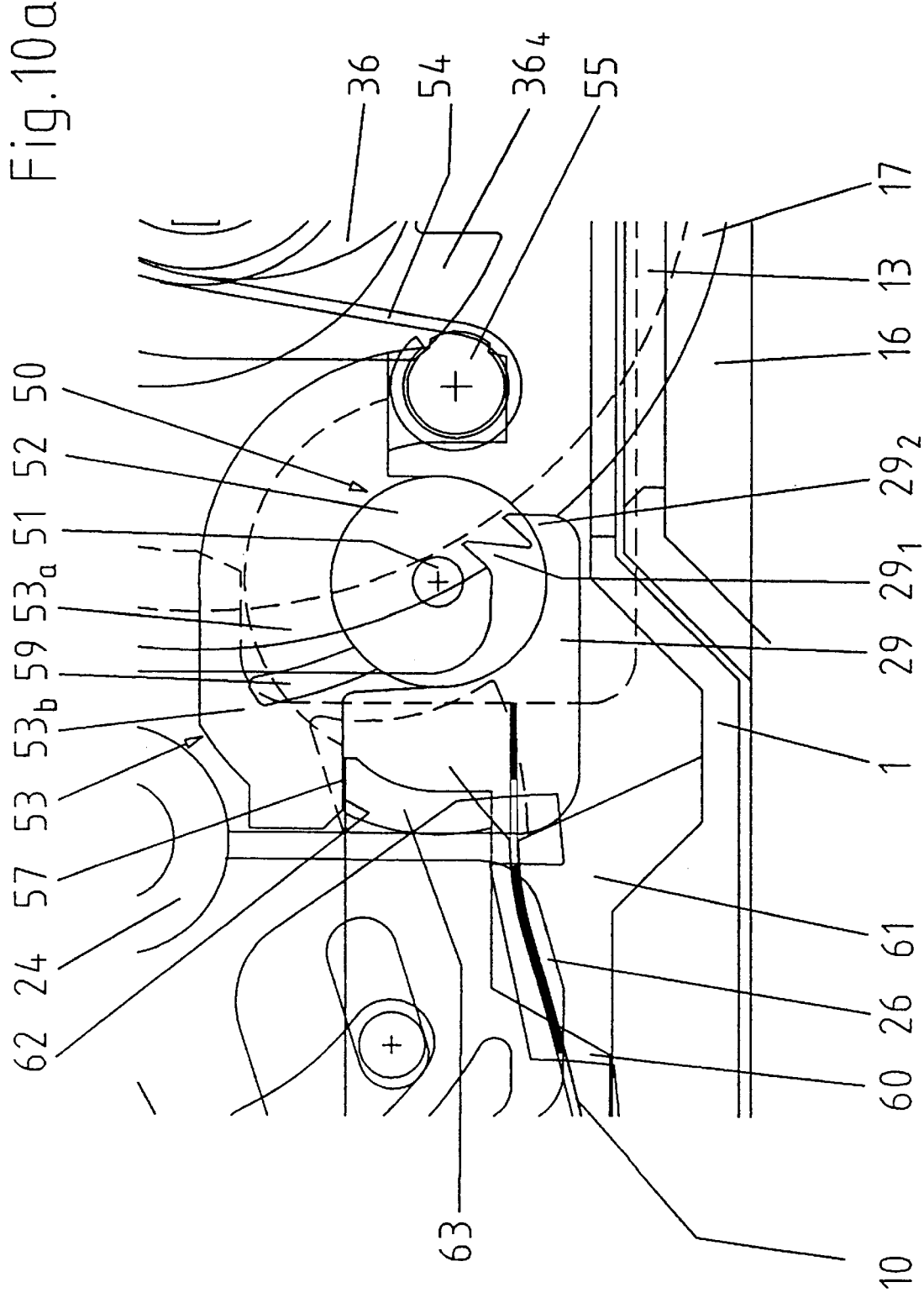

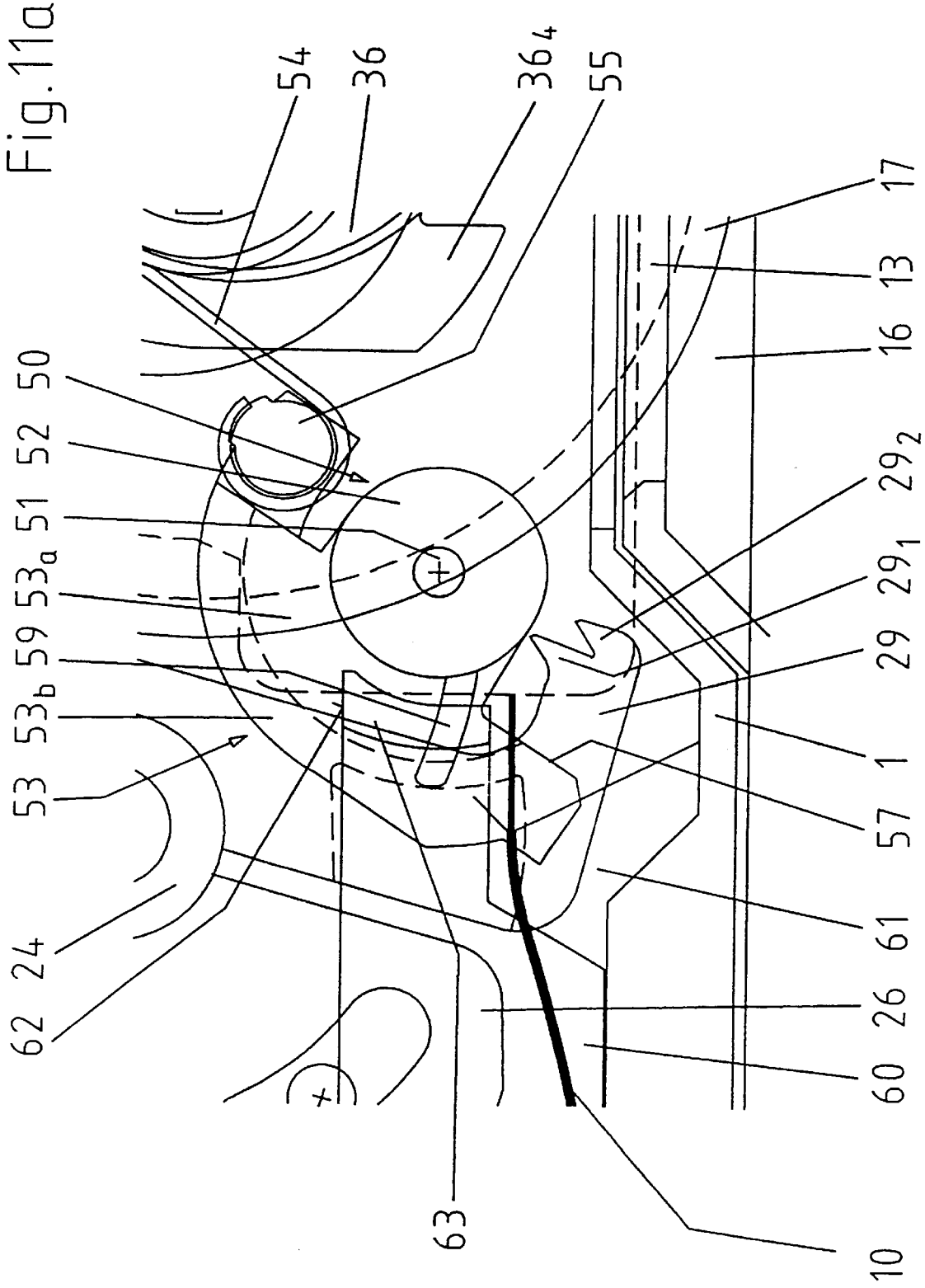

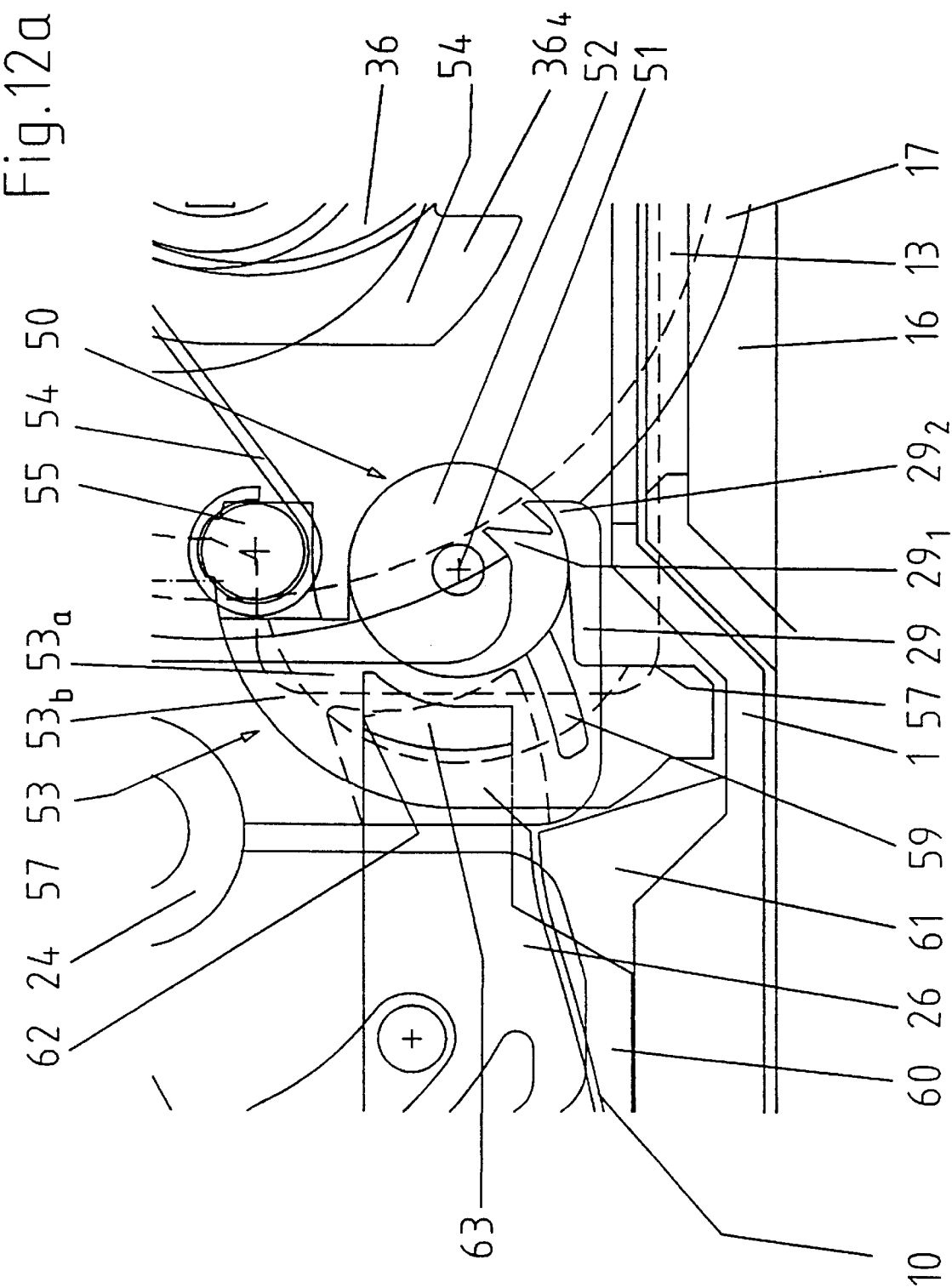

PHOTOGRAPHIC RECORDING OR REPRODUCING DEVICE WITH FRAME-BY-FRAME FILM TRANSPORT

The invention relates to a photographic recording or reproducing device, preferably a camera, having the features according to the preamble of claim 1.

There are numerous cameras having a transportation device for the frame-by-frame transportation of a film along a film transportation path and having a film measuring device with an engagement member, which is rotatable about an axis, for engaging in perforation holes of a peripheral perforation of the film, the film transportation device being locked when the film reaches a position during its transportation provided for the recording of an image.

Cameras of this type are predominantly designed for the use of film cassettes of the "135" packaging system and allow for single image or series image recordings. In these systems, the film comprises perforation holes along each of its two longitudinal edges, said holes being spaced uniformly at a relatively short distance apart. However, the perforation holes do not provide any direct reference to the positioning of successive photographic recordings on the film. There is therefore no fixed or predetermined association of the individual recordings with particular perforation holes of the peripheral perforation of the film. A film transportation device in association with a film measuring device is used for the stepwise advancement of the film. The film transportation device comprises a sprocket wheel, which engages with its teeth in the film perforation and is either rotated by the actuating device for the film transportation or by the moving film per se as a result of its engagement in the film perforation, and together with a gearing determines the length of the transportation path covered by the film per recording.

In addition, cameras are known which are designed for film cassettes of the "126" or "110" packaging system. In these systems, a single perforation hole is provided in one of the film edges per recording, each recording having a fixed relationship in terms of its position relative to the respective associated perforation hole. For the stepwise advancement of the film, the path of the perforation holes is sensed in the camera by means of a resiliently abutting scanner, a locking device of the camera blocking film transportation when the scanner drops into a perforation hole. During or following the execution of a photographic recording, the scanner is lifted again from the respective perforation hole, so that the film can then be further advanced by one frame for the following recording or to the end of the film after the last exposure. In this respect, the scanner is displaceable perpendicular to the plane of the film and in certain types of cameras of these systems is additionally rotatably mounted, so that after dropping into a perforation hole in the film the scanner is pivoted by the transportation movement of the film when said movement is continued, until a locking of the film transportation device is effected after a pawl triggering determined by the scanner.

It is the object of the invention to provide a photographic recording or reproducing device and preferably a camera of the initially-mentioned type, in which the film of a system having a fixed association of frame positioning and perforation holes is used, and the device for film measuring compensates slip in the transportation mechanism in a relatively simple manner.

This object is attained according to the invention by way of the features of the characterising part of claim 1.

Figure 13:
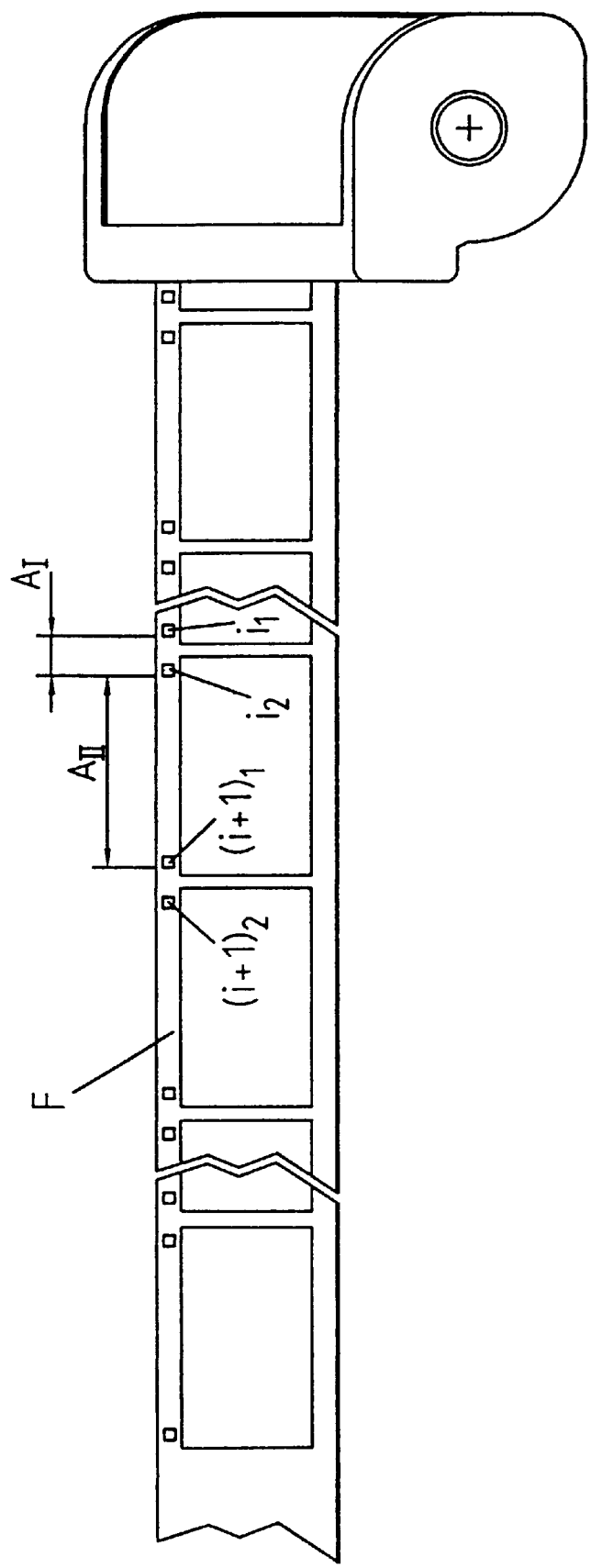

The device according to the invention should preferably be suitable for the use of films of a packaging type as schematically illustrated in FIG. 13 of the drawings. In this packaging type, the film F which can be withdrawn by sliding from a storage cassette K comprises two perforation holes $i_1$, $i_2$ per frame along one of its two longitudinal edges, said holes being arranged behind one another in the transportation direction and in each case in the vicinity of the frame web between two successive frames of the film. A comparatively short distance $A_1$ lies between the successive perforation holes of each perforation hole pair $i_1$, $i_2$, whilst the distance $A_2$ between the second perforation hole $i_2$ of a perforation hole pair $i_1$, $i_2$ of a frame and the first perforation hole $(i+1)_1$ of the perforation hole pair $(i+1)_1$, $(i+1)_2$ of the following frame is comparatively large and almost corresponds to the length of a frame. In this respect, $1 \leq i \leq n-1$, where n expresses the total number of frames provided on the film F.

In cases where a film cassette having a sealing member is used, which is transferred into a closed position after execution of the last photographic recording and the drawing of the film tail into the film cassette, then it is a further object of the invention to lock the film transportation device in a simple manner when the sealing member of the film cassette is transferred into the closed position.

This object is attained by way of the features of claim 17.

Further developments of the invention are contained in the subclaims.

Preferred embodiments of the invention are described in further detail in the following with reference to FIGS. 1 to 12 of the drawings.

Figure 11:
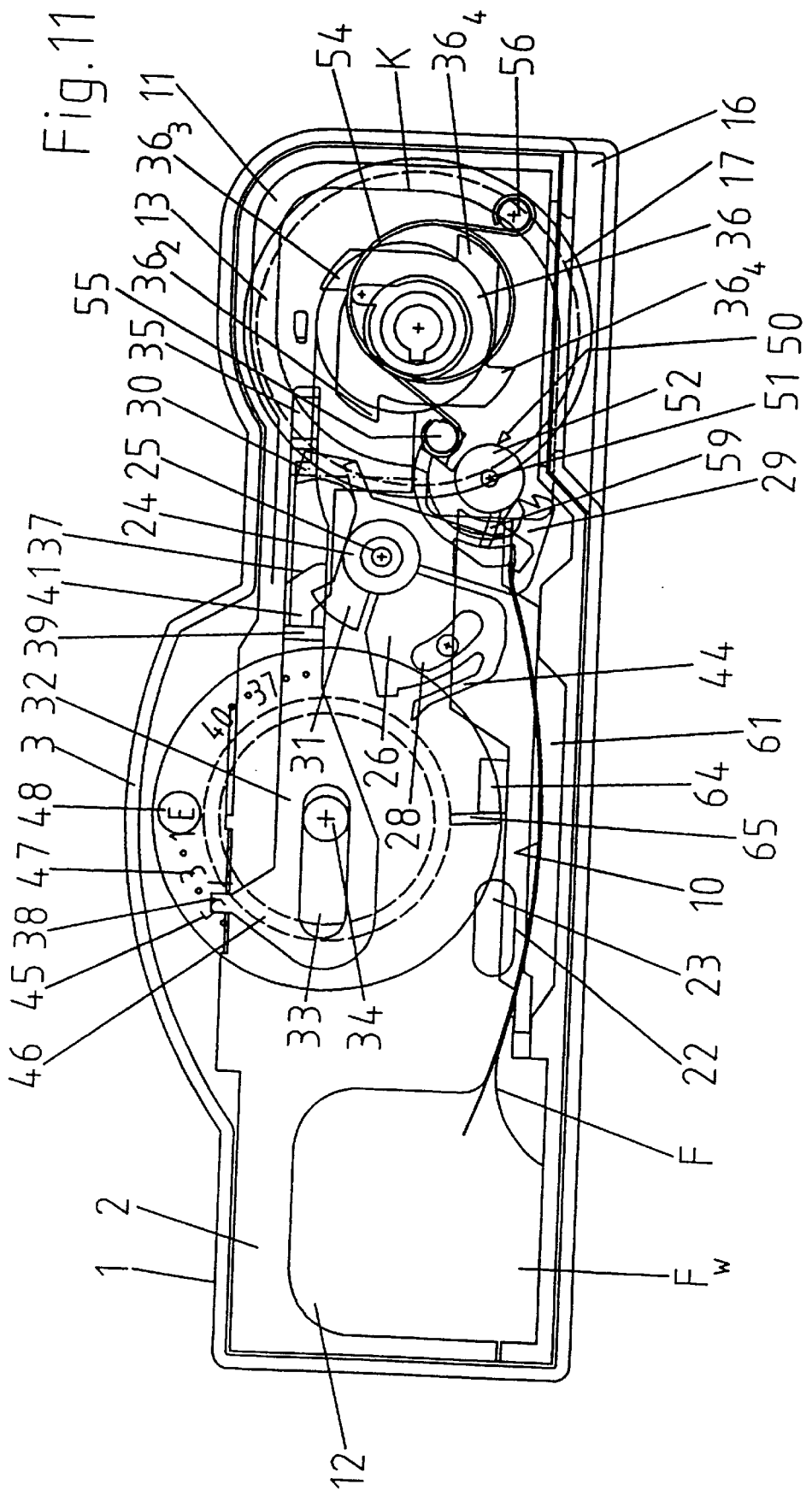
Figure 12:
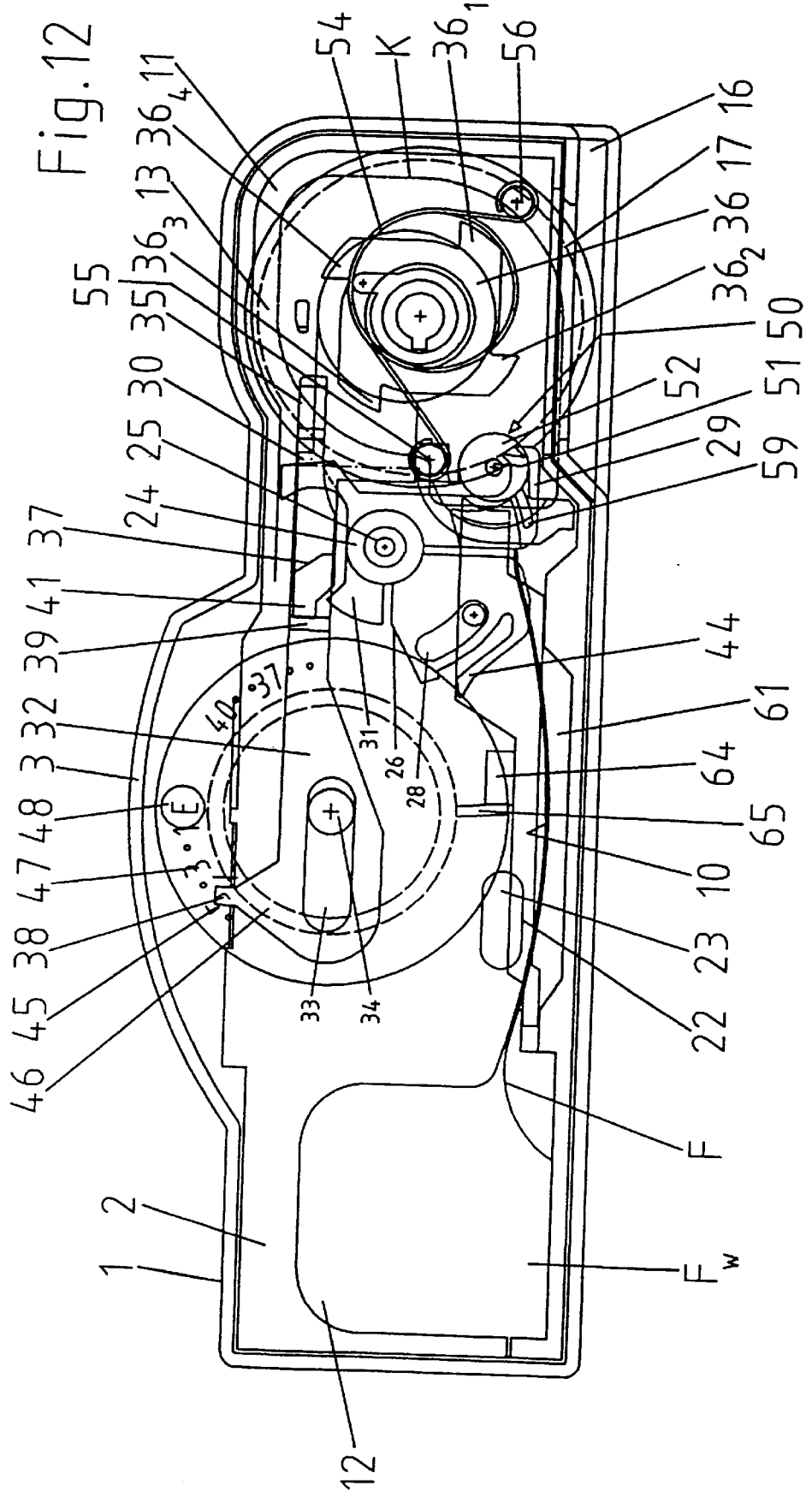

In the drawings, which are each schematic illustrations:

FIG. 1 is a plan view of an embodiment of a camera according to the invention with the upper housing section removed with the camera in the ready position for executing a photographic recording, FIG. 2 is a separate plan view of a sprocket lever of the camera according to FIG. 1, FIG. 3 is a separate plan view of a switching member of the camera according to FIG. 1, FIG. 4 is a separate plan view of a shutter slide of the camera according to FIG. 1, FIG. 5 is a separate plan view of a triggering mechanism of the camera according to FIG. 1, FIG. 6 is a rear view of the camera according to FIG. 1 with the rear housing section removed, FIG. 7 is a front view of the camera according to FIG. 1 with the front housing section removed, FIG. 8 shows the subject matter of FIG. 1 in the operating state directly following a photographic recording, FIG. 9 shows the subject matter of FIG. 1 in the operating state in an intermediate phase during the transportation of the film by one frame, FIG. 10 shows the subject matter of FIG. 1 in the operating state at the end of the film advance movement by one frame, FIG. 10a is an enlarged view of parts of the subject matter of FIG. 10, FIG. 11 shows parts of the subject matter of FIG. 1 in the operating state after execution of the last photographic recording which the film inserted in the camera allows in accordance with its capacity, FIG. 11a is an enlarged view of parts of the subject matter according to FIG. 11, FIG. 12 shows the subject matter of FIG. 11 in the operating state after closure of a sealing member of a film cassette inserted in the camera, and FIG. 12a is an enlarged view of parts of the subject matter of FIG. 12, and FIG. 13 is a schematic view of a film packaging type for which the camera according to FIGS. 1 to 12 is designed.

A preferred embodiment of a camera according to the invention, which is suitable for films of the "advanced photo system", is described in further detail in the following with the aid of the drawing and is schematically illustrated in the drawings in different operating states.

This embodiment of a camera according to the invention comprises a camera housing 1 with a lightproof inner housing 2 receiving a photographic film F and a lens tube 3. Arranged in the lens tube 3 is a photographic field lens 4, illustrated schematically in FIG. 6, for projecting a recording subject onto the photographic film F installed in the camera. A photographic shutter 5 is arranged in the light path behind the lens for the frame-by-frame exposure of the film with an exposure time determined by the duration of opening of the shutter.

As shown in FIG. 7, the shutter 5 is preferably formed by a single plate with an exposure aperture 7. The plate is pivotable about a housing-fixed axle 6 under the action of a shutter drive, not shown, and projects with an abutment 8 forming a shutter actuating member from the light-proof inner housing 2 into an upper housing section of the camera. In place of the single-plate shutter, a multi-plate lens shutter or a slot shutter can also be provided, particular in cases where the camera is constructed as a reflex camera and the film exposure window is flat in contrast to the illustration in FIG. 1. Preferably an adjustable aperture stop, not shown, can be provided separately as a lens stop in the region of the lens 4 or can be formed by a photographic multi-plate shutter during the opening movement thereof, so that the aperture stop is then a stop shutter.

The film F installed in the camera is preferably of the packaging type illustrated in FIG. 13 and is guided with its upper and lower edge in the region of a recording frame window 9 (referred to in the following as a film exposure window) in the inner housing 2 of the camera along a curved film platform 10, which forms a concave film guide path curving towards the photographic field lens 4. In this manner, the compensation of projection errors of the lens 4 can be effected more easily, so that the structural design of the lens can be simplified. However, a flat film guide path can also be provided in conventional fashion.

In the illustration in FIG. 1 and in FIGS. 8 and 9 of the drawings, the film F is transported from left to right in stepwise fashion for the execution of successive photographic recordings.

In preparation for said recording, after the insertion of a film cassette K into a cassette receiving chamber 11, which is arranged on the right-hand side of the camera housing 1 in the illustration according to FIG. 1 and is accessible from outside at the bottom via a loading flap, not shown, the unexposed film is already withdrawn by sliding from the film cassette and is transported from right to left without exposure, so that it is stored in a film storage chamber 12 of the camera housing 1 arranged on the left-hand side in the illustration according to FIG. 1, thereby forming a loose film coil $F_w$. The film end, however, remains secured to a film reel, not shown in the drawings, which is arranged inside the film cassette K. This state is referred to in the following as the film loading state.

The above-described preparatory film transportation from the film cassette K to the film storage chamber 12 can be effected by manual rotation of a film transportation wheel 13, which is fixed to the camera and is rotated in a clockwise direction with its shaft 14 rotatably mounted in the camera housing 1, to which end a coupling element 15, which is provided on the shaft 14 of the film transportation wheel 13, engages in a manner known per se with a coupling element (not shown) arranged in the end face of the film cassette K of the film reel (also not shown) contained in the film cassette when the film cassette K is inserted into the cassette receiving chamber 11 of the camera housing 1, so that when the film transportation wheel 13 is rotated the film reel of the film cassette K, which is coupled to the said film transportation wheel 13, is also rotated in the same direction.

In cases where the camera is already packaged with unexposed film by the manufacturer, the film F can be inserted from the outset in the camera in such a manner that the film is in the loading state described above.

During the subsequent execution of successive photographic recordings, the film F is transported back from this film loading state in stepwise fashion during the frame-by-frame exposure from left to right from the film storage chamber 12 of the camera housing 1 to the film cassette receiving chamber 11 and is wound back into the film cassette K, to which end the film reel of the film cassette K is rotated in the winding direction. This is effected by manual rotation of the film transportation wheel 13 with its shaft 14 in an anti-clockwise direction in the illustration according to FIG. 1.

In order to allow for and to facilitate manual actuation of the film transportation wheel 13 by the camera user, the film transportation wheel projects slightly outwards with part of its circumference through a recess 16 in the rear side of the camera housing 1 and comprises on its outer circumference knurling 17 constructed as a toothed rim.

The film transportation wheel 13 thus acts as an actuating device for the film transportation. This actuating device can also be constructed in a manner known per se as a rapid shift lever in contrast to its illustrated construction as a film transportation wheel. In cameras having a motor drive, the actuating device can also be constructed as a motor-actuated film transportation device.

A film measuring device arranged in the camera housing 1 comprises a single-arm sprocket lever 18 (referred to in the following as the sprocket lever) which has been described as an engagement member and which is provided for sensing the film perforation in the inner housing 2. In the vicinity of its free end, the sprocket lever 18 comprises a slit 19 (also referred to in the following as the slot 19), which is radially oriented in relation to the pivot axis of the sprocket lever, and two teeth $18_1$, $18_2$ acting as engagement elements on the flank 20 facing the film transportation path. A pivot axis of the sprocket lever 18 is formed by a pin 21 rigidly secured thereon, which projects into a slot 22 or sliding connection in a housing-fixed plate 23 extending approximately parallel to the film transportation direction and can slide to and fro within said slot. In this manner, the sprocket lever 18 is rotatable about the axis of the pin 21 and can be displaced in the slot 22 in the intermediate plate 23 by displacing the pin 21. In this respect, the sprocket lever 18 is acted upon with friction by non-illustrated bearing means on the intermediate plate 23, so that said lever maintains its respective position so long as it is not adjusted in a manner described in further detail below so as to overcome said frictional locking.

As is visible in particular in FIG. 4, the teeth $18_1$ to $18_6$ on the flank 20 of the sprocket lever 18 are arranged and designed in such a manner that they can each engage in adjacent perforation holes $i_1$, $i_2$ in the film F when corresponding perforation regions of the film F pass the sprocket lever 18 during the transportation of the film F towards the film cassette K in the operating states according to FIGS. 1, 5, 6 and 7. The reciprocal distance of the two teeth $18_1$, $18_2$ corresponds to the short distance $A_1$ between two perforation holes of each perforation hole pair $i_1$, $i_2$ in the film F of the packaging type illustrated in FIG. 13.

Furthermore, the film measuring device comprises a switching or actuation member 24, which is arranged inside the camera housing above the inner housing 2 and is rotatable about an axle 25 fixed to the housing and can thereby adopt different switching positions according to FIG. 1 and FIGS. 8 to 10. For further clarification, the switching member 24 is also shown separately in FIG. 2. The switching member 24 is acted upon by a non-illustrated loop spring or other spring, which attempts to rotate the coupling member in an anti-clockwise direction about the axis 25 in the illustration according to FIG. 1.

The switching member 24 comprises a segment 26, which projects radially from the pivot axis 25 and on which a coupling rod 27 is secured, which projects downwards in the illustration according to FIG. 1. The coupling rod 27 projects through an arched slit 28 in the inner housing 2 and into the interior thereof and engages with the slit 19 of the sprocket lever 18. The coupling rod 27 supports a non-illustrated cover plate, which covers the slit 28 in a light-proof manner in each switching position of the coupling rod 27, so that disturbing light penetration through the slit 28 into the interior of the inner housing 2 is prevented.

In addition, the switching member 24 comprises three lever arms 29, 30, 31, which also project radially from the pivot axis 25 and are angularly offset relative to one another.

The lever arm or locking structure 29 of the switching member 24 is cranked and at its free end comprises two teeth $29_1$, $29_2$, which upon a corresponding rotation of the switching member 24 in an anti-clockwise direction can engage in the knurling 17 of the film transportation wheel 13. In this position, the lever arm 29 acts as a locking pawl, in order to lock the film transportation wheel 13 against actuation in the direction of the frame-by-frame film transportation, whilst the film transportation wheel 13 is released by the lever arm 29 when the switching member 24 is rotated in a clockwise direction, so that the film transportation wheel can be actuated for frame-by-frame film transportation.

The lever arm 30 of the switching member 24 is also cranked and projects with its free end into the displacement path of a shutter slide 32, which is also illustrated separately in FIG. 5, is cranked in stepped fashion in the illustration according to FIG. 7 and can also be reciprocated in the camera housing 1 above the inner housing approximately parallel to the film transportation device. To this end, the lever arm 30 with a slot 33 at its left-hand end in the illustration according to FIGS. 1 and 5 is guided by a guide rod 34 engaging with said slot. The right-hand end 35 of the shutter slide 32 can come to rest alternately against cams $36_1$, $36_2$, $36_3$ and $36_4$ of a cam disc 36 secured to the bearing shaft 14 of the film transportation wheel 13, and when the cam disc 36 is rotated can be displaced to the left in the illustration according to FIG. 9, namely against the restoring force of a non-illustrated drive spring or tensioning spring, which attempts to move the shutter slide to the right in the illustration according to FIG. 1 and also to act upon said shutter slide with a force component which moves the right-hand end region 35 towards the cam disc 36. With its stepped section formed by the cranking, the shutter slide 32 forms an abutment 37 for the lever arm 30 of the switching member 24. In addition, the shutter slide 32 comprises a projection 38, which cooperates with the abutment 8 of the photographic shutter 5 acting as the shutter actuating member.

The lever arm 31 of the switching member 24 cooperates with a locking member 41 of a triggering mechanism 40, which is also shown separately in FIG. 5, is constructed as a rocker, is rotatable about a housing-fixed axis 42 arranged parallel to the optical axis of the photographic lens 4 and is acted upon by a non-illustrated spring, which attempts to rotate the triggering mechanism 40 in an anti-clockwise direction in the illustration according to FIG. 6 as far as an abutment marking a starting position. On the side opposite to the locking member 41, the triggering mechanism 40 comprises a trigger button 43, which is arranged on the upper side of the camera above the film transportation wheel 13, without being fixedly connected therewith, for manual actuation by the camera user. The free end of the locking member 41 cooperates with a web 39 on the shutter slide 32 in order to lock the shutter slide 32 in the position shown in FIG. 1. In contrast, when the switching member 24 is rotated in a clockwise direction, the lever arm 31 moves to closely cover the locking member 41 of the triggering mechanism 40, so that the triggering mechanism is then secured against actuation by the depression of the trigger button 43.

Finally, the switching member 24 also comprises an elongated switching tooth 44, which forms an extension on the segment 26 of the switching member and is arranged approximately tangentially thereon. The switching tooth 44 can releasably engage with its free end in a toothed rim 46 of a frame counter disc 45, which is rotatably mounted on the guide rod 34 for the shutter slide 32. The frame counter disc 45 carries display markings 47 corresponding to the numerical sequence of frames on the film F and is visible with one display marking at a time through an observation window 48 in the camera housing 1. When the switching, member 24 is rotated in a clockwise direction in the illustration according to FIG. 1, the switching tooth 44 advances the frame counter disc 45 by one step from one display marking 47 to the next.

The switching member 24 is preferably integrally constructed in the form of an injection-moulded plastics material part with its segment 26, including the coupling rod 27, with its lever arms 29, 30, 31 and with its switching tooth 44.

The method of operation of the above-described measuring device of the camera is as follows:

Ready-for-recording operating state:

In the ready-for-recording operating state of the camera, the above-described gearing arrangement adopts the operating state illustrated in FIG. 1. In this case, the shutter slide 32 adopts its end position, in which it is displaced to the right-hand side, and is secured from sliding to the left by resting with its web 39 against the locking member 41 of the triggering mechanism 40. The drive spring of the shutter slide 32 cannot therefore be effective. The switching member 24 engages under the action of its loop spring with its lever arm 29 in the knurling 17 of the film transportation wheel 13, so that the latter is locked against rotation in an anti-clockwise direction and is therefore blocked in the direction provided for the frame-by-frame film transportation. At the same time, the sprocket lever 18 adopts a position in which its bearing pin 21 lies approximately in the centre of the slot 22 in the intermediate plate 23 and the teeth $18_1$, $18_2$ of the sprocket lever 18 engage in adjacent perforation holes $i_1$, $i_2$ of the film F inserted in the camera, the section of the film F arranged in the aperture of the inner housing 2 of the camera being as yet unexposed. The switching tooth 44 is disengaged from the toothing 46 of the frame counter disc 45. The triggering mechanism 40 adopts the position according to FIGS. 1 and 6 and is released for possible actuation, since its locking member 41 is not covered by the lever arm 31 in the position of the switching member 24 according to FIG. 1.

Operating state following a photographic recording:

In order to trigger a photographic recording, i.e. in order to transfer to the operating state according to FIG. 8, the trigger button 43 is pressed downwards by the camera user, so that the triggering mechanism 40 is pivoted against the restoring force of its spring about the axis 41 in a clockwise direction in the illustration according to FIG. 6. This effects a pivoting of the locking member 41 in a clockwise direction in the illustration according to FIGS. 1 and 6, i.e. upwards. As a result, the locking member 41 disengages from the web 39 of the shutter slide 32, so that it is released and is displaced under the action of its drive spring from the position according to FIG. 1 into the position according to FIG. 8, the length of the displacement path being determined by the length of the slot 33.

During this displacement movement of the shutter slide 32, the projection 38 of said shutter slide 32 runs against the actuating lever 8 of the photographic shutter 5, so that the shutter 5 effects an opening movement and then under the action of its own drive spring effects a closing movement, the section of the film F located in the aperture 9 of the inner housing 2 being exposed over one frame by the light entering through the lens 4.

Furthermore, when the shutter slide 32 is displaced from the position according to FIG. 1 into the position according to FIG. 8, its abutment 37 runs against the lever arm 30 of the switching member 24 and rotates said lever arm together with the switching member in a clockwise direction, so that the switching member 24 reaches the position according to FIG. 8. This is possible on account of the fact that the drive spring of the shutter slide 32 is more powerful than the adjusting spring of the switching member 24 acting in the opposite direction, so that the restoring force of said adjusting spring is overcome and the adjusting spring is tensioned.

As a result of the above-described clockwise rotation of the switching member 24 into the position according to FIG. 8, the lever arm 29 disengages from the knurling 17 of the film transportation wheel 13, so that the latter is released and can then be actuated for film transportation, as is described in further detail below.

At the same time, the rotation of the segment 26 which occurs during the above-described rotation of the switching member 24, causes the switching tooth 44 of the switching member 24 to engage in the peripheral toothing 46 of the frame counter disc 45, so as to advance said disc by one frame number marking, corresponding to one frame advance.

The rotation of the segment 26 which occurs during the above-described rotation of the switching member 24 also produces an anti-clockwise rotation of the sprocket lever 18 about the pin 21 via the coupling rod 27 arranged on the segment 26, so that the teeth 18$_1$, 18$_2$ of the sprocket lever 18 are lifted from the perforation of the film F. Consequently, said teeth are in their raised state in Fig. 8. In this respect, the rod-slot-coupling formed by the coupling rod 27 of the segment 26 of the switching member 24 and the slot 19 in the sprocket lever 18 is constructed in such a manner that the sprocket lever 18 is also longitudinally adjusted during the above-described rotational movement which effects the lifting of the teeth 18$_1$ and 18$_2$ from the film perforation, so that the bearing pin 21 of the sprocket lever 18 passes to the left-hand edge of the slot 22 in the intermediate plate 23 or moves into the vicinity of this left-hand edge.

At the same time, the lever arm 31 of the switching member 24 pivots into a position in which it slides over the locking member 41 of the triggering mechanism 40. If the camera user has not yet released the trigger button 43 at this point in time, so that the locking member 41 is still in its raised position, matching lateral inclined surfaces on the lever arm 31 of the switching member 24 and on the locking member 41 of the triggering mechanism 40 facilitate a sliding of the lever arm 31 over the locking member 41. Once the operating state according to FIG. 8 is reached, the triggering mechanism 40 is locked against immediate renewed actuation, which prevents undesirable double or multiple exposure of an already exposed section of the film F which is nevertheless still located in the aperture 9 of the inner housing 2.

During the above-described displacement from the position according to FIG. 1 into the position according to FIG. 8, the shutter slide 32 moves with its right-hand end region 35 in front of the radial flank of the cam 36$_1$ of the cam disc 36, as shown in FIG. 8. However, if in this operating state a cam of the cam disc 36 happens to be in a position—as a result of a preceding switching cycle—which lies further forward in the anti-clockwise direction of rotation of the cam disc 36 than the position shown in FIG. 8, then the shutter slide 32 runs with its right-hand end 35 onto the tangential flank of said cam and only drops in front of the radial flank of the following cam of the cam disc 36 at the start of a subsequent rotation of the cam disc resulting from actuation of the film transportation wheel 13, so that a state is then also reached which corresponds to the operating state according to FIG. 8.

Operating state during film transportation:

During the subsequent transportation of the film F by one frame, the film transportation wheel 13 which has already been released by the lever arm 29 of the switching member 24 is rotated by manual actuation in an anti-clockwise direction, so that the film F is transported to the right in the illustration according to FIG. 8 in a first partial phase of the film transportation process by a first partial distance of a frame advance, which in the case of the frame counter state assumed in FIG. 8, for example, results in a reduction in the film coil F$_w$ in the film winding chamber 12 of the inner housing 2 of the camera, as shown in FIG. 9. At the same time, in this first partial phase of the film transportation process, as a result of the anti-clockwise rotation of the cam disc 36, the shutter slide 32 is displaced to the left by the cam 36$_1$ or optionally by another cam resting against the end region 35 of the shutter slide 32 against the restoring force of the drive spring of the shutter slide 32, until said cam slides with its radial flank off the end face of the end region 35 of the shutter slide 32 during the further rotational movement of the cam disc 36. In this intermediate phase, the shutter slide 32 has reached a position according to FIG. 9, which insofar corresponds to the starting position according to FIG. 1. In this position, the shutter slide 32 is again locked by the locking member 41 of the triggering mechanism 40 dropping behind the web 39 of the shutter slide 32, so that the shutter slide 32 remains in its position according to FIG. 9 opposing the restoring force of its drive spring, even though the cam of the cam disc 36 which effected the displacement of the shutter slide into the position according to FIG. 9 has slid off the end face of the end region 35 of the shutter slide 32 during the further rotation of the film transportation wheel 13 and therefore during the further rotation of the cam disc 36, as shown in FIG. 9.

Also participating in the above-described displacement of the shutter slide 32 from the position according to FIG. 8 in the direction towards the position according to FIG. 9 is the abutment 37, so that the lever arm 30 and therefore the entire switching member 24 can follow this movement of the abutment 37 on account of the action of the adjusting spring of the switching member 24. This effects a partial rotation of the switching member 24 in an anti-clockwise direction about the axis 25 into the intermediate position according to FIG 9, until the sprocket lever 18 which is coupled to the switching member 24 via the segment 26 and the coupling rod 27 moves from the inoperative position according to FIG. 8, in which the teeth $18_1$, $18_2$ are fully lifted from the film path, into a sensing position according to FIG. 9, in which the teeth $18_1$, $18_2$ rest resiliently against the peripheral strip of the film F provided with the perforation under the action of the adjusting spring of the switching member 24. As a result of the film movement in the above-described first partial phase of the film advancement process, a partial section of the film edge lies in this operating phase without perforation holes beneath the teeth of the sprocket lever 18 resting upon the film, so that said teeth rest upon the upper surface of the film.

A further rotation of the switching member 24, which has reached the intermediate position according to FIG. 9, about the axis 25 is at first impossible as a result of the coupling between the sprocket wheel 18 and the switching member 24 in spite of the fact that the abutment 37 of the shutter slide 32 has lifted from the lever arm 30 of the switching member 24 as a result of the described displacement of the shutter slide 32 into the position according to FIG. 9, as also shown in FIG. 9, so that said abutment 37 does not in itself prevent an automatic further rotation of the switching member 24 in an anti-clockwise direction.

With the further actuation of the film transportation wheel 13, the peripheral strip of the film F slides beneath the teeth $18_1$, $18_2$ of the sprocket lever 18 resting resiliently on the film, until the perforation holes $(i+1)_1$, $(i+1)_2$ associated with the next frame section of the film come to lie beneath the teeth $18_1$, $18_2$ of the sprocket lever 18. When this state is reached, the teeth $18^1$, $18_2$ of the sprocket lever 18 drop under the action of the adjusting spring of the switching member 24 coupled therewith simultaneously into one of these perforation holes of the film F in each case, the sprocket lever 18 thereby completing its clockwise rotation about the pin 21. As a result, the switching member 24 also continues its anti-clockwise rotational movement about the axis 25 at the same time, so that the lever arm 29 drops in the manner of a pawl into the knurling 17 of the film transportation wheel 13 and locks said wheel against further rotation in the direction of film transportation, so that the advance of the film transportation by a full frame step is prevented.

If, during the above-described rotational movement of the switching member 24, it should happen that the lever arm 29 does not engage with its teeth $29_1$, $29_2$ between adjacent teeth of the knurling 17 of the film transportation wheel 13, but meets the tip of a tooth of this type, then it is necessary to rotate the film transportation wheel 13 by a further slight angular degree in order to complete the film transportation movement by a full frame, so that slippage occurs. However, the teeth $18_1$, $18_2$ of the sprocket lever 18 have already dropped so deeply into the perforation holes of the film in this operating state that a further transportation of the film could result in damage by tearing of the perforation holes. In order to prevent such damage, the sprocket lever 18 is mounted so that its pin 21 is displaceable within the slot 22 approximately parallel to the film transportation direction and can therefore be driven along in the film transportation direction in order to overcome the above-mentioned slippage in the event of a continuation of the film transportation, without the tearing strength of the edges of the perforation holes of the film being loaded. In this respect, the bearing pin 21 of the sprocket lever 18 is displaced within the slot 22 of the intermediate plate 23 from the position according to FIG. 9 in the direction of the centre of said slot 22, as illustrated in FIG. 10.

The displaceable mounting of the sprocket lever 18 approximately parallel to the film transportation direction is also advantageous in order to compensate in a simple manner any possible manufacturing tolerances as regards the dimensioning and arrangement of the perforation holes of the film and/or a certain degree of play between the components of the gearing of the above-described measuring device, so far as this is not already effected by the slot 23 in the sprocket lever 18.

With the completion of the process for film transportation by one full frame, the described measuring device reaches an operating state according to FIG. 10, which corresponds to the initial starting position according to FIG. 1, but with the difference that the cam disc 36 now adopts a position which is rotated by the angular distance between two adjacent cams, i.e. through 90° relative to the starting position in the embodiment illustrated in the drawings, and the frame counter disc 45 is advanced by one frame number marking. For example, instead of the frame counter disc indicating the frame number "2" in the operating state according to FIG. 1, it is adjusted to the frame number "1" during the transfer from the operating state according to FIG. 1 into the operating state according to FIG. 10. At the same time, the length of the film still remaining in coil form in the film winding chamber 12 and therefore the number of film turns forming the film coil $F_w$ is correspondingly reduced.

All the locking and release states described above in connection with the initial operating state according to FIG. 1 are adopted again by the camera when the operating state according to FIG. 10 is reached, i.e. after completion of a film transportation process by one full frame. In particular, the shutter slide 32 is tensioned again in this operating state and again locks the film transportation wheel 13 against rotation for frame-by-frame film transportation.

The above-described operating sequence can then be repeated from the operating state according to FIG. 10 during the subsequent photographic recordings, so long as the image counter mechanism has not yet reached the "E" marking indicating that the capacity of the film is exhausted and further photographic recordings are no longer possible. This operating state is described separately below.

In general the above-described solution can be used for the frame-by-frame advancement of films comprising perforation holes having narrow and wide reciprocal spacing. The spacing between adjacent teeth of the sprocket lever 18 of the camera should correspond to the shorter distance between successive perforation holes in the film.

In cases where adjacent perforation holes of the film have a different cross sectional profile, the teeth $18_1$ and $18_2$ of the sprocket lever also comprise a correspondingly adapted different cross sectional profile.

If the above-described camera is designed for films of a different packaging type, in which only one perforation hole is provided per frame in contrast to the packaging type according to FIG. 14, then it is of course only necessary to provide one tooth on the sprocket lever 18 in place of the two teeth $18_1$, $18_2$.

By way of example, the above-described embodiment embodies the general teaching that, in a photographic recording or reproducing device, preferably in a camera, with a transportation device for the frame-by-frame transportation of a film along a film transportation path and a film measuring device with a rotatably and displaceably mounted engagement member for engaging in a peripheral perforation in the film, the film transportation device being locked when the film reaches a position during its transportation which is provided for the recording or reproduction of an image, the engagement member effects the engagement in the film perforation by pivoting transversely to the film transportation path and a pivot axis of the engagement member is displaceable approximately parallel to the film transportation path. In this respect, the engagement member can rest resiliently upon the film and sense the track of the peripheral perforation of said film. The engagement member is preferably formed by the lever 18, which comprises at least one engagement tooth $18_1$, $18_2$. The engagement member preferably comprises two engagement teeth $18_1$, $18_2$, which are adapted in their reciprocal spacing and in their cross sectional form to match the spacing and cross sectional form of two adjacent perforation holes $i_1$, $i_2$ of the film in each case.

As described above and illustrated in the drawings, the sprocket lever 18 forming the engagement member can be displaceably and preferably frictionally mounted with its pivot axis 21 in a slot 22 in a housing plate 23 extending approximately parallel to the film transportation path. The engagement member which is preferably constructed as a sprocket lever 18 can control a locking device for locking the film transportation device and can be controllable by the film transportation device or by a shutter triggering mechanism, preferably by the shutter slide 32 of the shutter triggering mechanism or by the switching member 24 which is controllable by the shutter triggering mechanism and is preferably rotatably arranged. The engagement member is preferably connected to a locking device for the film transportation device constructed in the form of the lever arm 29, said lever arm engaging in the manner of a pawl in a toothed rim 17 of a film transportation wheel 13 of the film transportation device and being optionally arranged directly on the switching member 24. Furthermore, the switching member 24 can cooperate with the frame counting device 45.

As explained above, the above-described embodiment also embodies by way of example the general teaching that a shutter slide 32 controls the sprocket lever 18 for film measuring during the frame-by-frame film advancement via a switching member, preferably via the switching member 24.

In the following, particular reference is made to FIGS. 10, 10a, 11, 11a, 12 and 12a of the drawings. FIGS. 10a, 11a and 12a are each enlarged illustrations of parts of the subject matter of FIGS. 10, 11 and 12. The camera according to FIG. 10, 10a, 11, 11a, 12 and 12a comprises all the components of FIGS. 1 to 9, but part of these components is no longer shown in FIGS. 10, 10a, 11, 11a, 12 and 12a for the sake of clarity of these drawings.

On the other hand, the reference numerals used in FIGS. 10a, 11a and 12a also apply for the corresponding parts of the other drawings, even when all the reference numerals are not entered on the drawings to allow for greater clarity of said drawings.

With the aid of these drawings, a device is described in the following which locks the film transportation wheel 13 as a function of the closing movement of a sealing member of the film cassette during the frame-by-frame exposure of a film for, for example, 40 recordings once the last photographic recording has been made and a film tail has been drawn into the film cassette, it being assumed that a film cassette with a rotatably mounted sealing member adjustable from an open position into a closed position is inserted in the camera, which sealing member releases a film mouth of the film cassette for the passage of the film in its open position and in its closed position seals the film mouth in a lightproof manner once the film has been fully wound into the film cassette and before the film cassette has been removed from the camera for development and further processing of the film which is contained in said cassette and which has been exposed frame-by-frame.

Since film cassettes of this type of the Advanced Photo System are known, they have not been illustrated in further detail in the drawings.

However, the drawings show a drive device 50 for the sealing member of a film cassette of this type. The drive device 50 is arranged in the camera housing 1 above the inner housing 2 in the vicinity of the film transportation wheel 13 and has a shaft 51, which projects according to FIG. 6 into the film cassette chamber 11 and when a film cassette of the Advanced Photo System is inserted into the film cassette chamber 11 is automatically coupled with a non-illustrated cassette shaft of the sealing member of the film cassette K.

The drive device 50 also comprises a disc 52 arranged on the shaft 51 with a radially projecting segment 53 with an inner region 53a and a peripheral region 53b which is raised in the shape of a cup. A Ω-spring 54 for driving the drive device 50 is suspended with one end upon a peripheral journal 55 of the segment 53 and with its other end on a journal 56 fixed to the housing and is prestressed in such a manner that it attempts to rotate the drive device 50 in an anti-clockwise direction. Diagonally opposite the journal 55, the segment 53 comprises a radially extending abutment edge 57. In addition, the drive device 50 comprises an approximately radially projecting, downwardly pointing web 59, which can cooperate with a head-like, concave abutment 60, which is arranged on the lever arm 29 of the switching member 24 and projects downwards.

The drive device 50 is controllable by the frame counter disc 45. To this end, a transmission member is provided, which is preferably constructed as a control slide 61 and is also provided in the camera housing 1 above the inner housing 2. The control slide 61 is mounted in a manner not explained in further detail so as to be longitudinally displaceable parallel to the film transportation direction and is acted upon by a spring, not shown, which attempts to pull the control slide to the left in the illustration according to FIG. 10, but not beyond the position shown in FIG. 10. The control slide 61 comprises an abutment 64, which projects into the path of movement of a web 65, which is arranged on the frame counter disc 45 in a particular angular relationship to the frame number marking or to the counter mechanism position "1", so that it comes to rest against the abutment 64 of the control slide 61 when the frame counter disc 45 reaches the counter state "1" during the execution of successive photographic recordings, as illustrated in FIG. 10, i.e. when the last section of the film F is ready for exposure and before any further recordings can be made. The right-hand end region of the control slide 61 in FIG. 10 comprises an abutment surface 62 cooperating with the abutment edge 57 of the segment 53 of the drive device 50 and an upwardly pointing projection 63, which can engage behind the downwardly extended, cup-shaped peripheral region 53b of the segment 53 of the drive device 50, when it moves into the inner region 53a of the segment 53 in a manner described in further detail below.

The method of operation of this device is as follows:

In the operating state according to FIG. 10, in which the frame counter disc 45 is set to the counter state "1" and therefore indicates to the camera user that only one more photographic recording can be made, before all frames of the film F arranged in the camera have been exposed frame-by-frame, the control slide 61 adopts the position shown in FIG. 10 and more clearly in FIG. 10a, as in the preceding operating cycles (one operating cycle per recording), in which the abutment surface 62 on the control slide 61 or on the projection 63 thereof lies opposite the abutment edge 57 of the drive device 50 for the sealing member of the film cassette K and thereby secures the drive device 50 against anti-clockwise rotation, so that the adjusting force of the Ω-spring 54 cannot act upon the drive device 50.

If the last possible photographic recording is carried out from the operating state according to FIG. 10 by actuating the trigger button 43, an operating sequence is repeated according to the above description as after the execution of preceding photographic recordings. More particularly, after the actuation of the trigger button 43, the shutter slide 32 again moves under the action of its drive spring from its tensioned position according to FIG. 10 to the right, in order to again adopt a relaxed position corresponding to the position shown in FIG. 8, as was also adopted in the preceding operating cycles. With this displacement of the shutter slide 32 from the operating state according to FIG. 10 into its relaxed position, the switching member 24 is again adjusted by clockwise rotation into a position corresponding to the position according to FIG. 8 as in the preceding operating cycles, which results in the frame counter disc 45 being advanced from the frame number marking "1" (FIG. 10) to the following frame number marking "E", as is shown in FIG. 11 which will be explained in further detail below.

In contrast to the preceding operating cycles, the web 65 now rests against the abutment 64 of the control slide 61 since reaching the operating state according to FIG. 10, and adjusts the control slide 61 to the right against the action of its restoring spring when the image counter disc 45 is adjusted from the counter position "1" into the counter position "E". In this respect, the control slide 61 travels with its abutment surface 62 to the right away from the region of the abutment edge 57 on the segment 53 of the drive device 50, the projection 63 of the control slide 61 passing behind the peripheral region 53b and into the inner region 53a of the segment 53. Consequently, the control slide 61 releases the drive device 50, so that the drive device 50 can rotate in an anti-clockwise direction under the action of its Ω-spring 54, until the drive device 50 reaches an intermediate position corresponding to a rotational movement, as a result of which the sealing member of the film cassette moves in a manner not shown from the open position into an intermediate position, in which it rests resiliently upon the film F which has not yet been fully drawn into the film cassette K. At first, the sealing member of the film cassette remains in this intermediate position, so that the drive device 50 coupled to the sealing member also remains in its above-described intermediate position. This intermediate position of the drive device 50 is illustrated in FIGS. 11 and 11a. As shown in these drawings, in this intermediate position of the drive device 50, the web 59 of the drive device, which previously adopted an "11 o'clock" position in the illustration according to FIGS. 10 and 10a, now adopts a position approximately corresponding to a "9 o'clock" position.

If the shutter slide 32 is again transferred to its tensioned position according to FIG. 11 by the actuation of the film transportation wheel 13, then the switching member 24 begins to rotate with its lever arm 29 and its other switching elements in an anti-clockwise direction, as in the preceding switching cycles. As shown in FIGS. 11 and 11a, the abutment 60 of the lever arm 29 thereby comes to rest against the end face of the web 59 of the drive device 50 which has been pivoted into the above-described "9 o'clock" position, before the sprocket lever 18 with its teeth 18₁, 18₂ reaches a sensing position in which its teeth 18₁, 18₂ have been lowered onto the film. In this operating state, the sprocket lever 18 therefore remains with its teeth 18₁, 18₂ at a distance above the film transportation path, without contacting the film.

If the film F is then drawn with its tail into the film cassette K by further actuation of the film transportation wheel 13, then the sealing member of the film cassette, which has so far rested in its intermediate position in a sliding manner upon the film, is transferred by the drive device 50 coupled therewith under the action of its Ω-spring 54 into the closed position, as soon as the rear end of the film F has passed the film mouth of the film cassette and the film has been fully drawn into the film cassette, so that a further anti-clockwise rotation of the drive device 50 is no longer prevented as a result of the film which has been fully drawn into the film cassette. The drive device 50 therefore moves into the position according to FIGS. 12 and 12a, in which the web 59 is guided out of the region of the abutment 60 of the lever arm 29 of the switching member 24 and adopts a position approximately corresponding to a "7 o'clock" position. In this position, the web 59 has released the abutment 60, so that the switching member 24 with its lever arm 29 and its other switching elements can continue the anti-clockwise rotational movement under the action of its adjusting spring after the above-described interruption, until the teeth 29₁, 29₂ of the lever arm 29 or at least one of these two teeth engages in the manner of a pawl with the toothed rim-like knurling 17 of the film transportation wheel 13, thereby locking the film transportation wheel 13. The film transportation wheel 13 can then no longer be actuated.

Consequently, in addition to the frame state display "E" in the display window 48, it is also indicated to the camera user that no further photographic recordings can be made. In the same manner, it is also indicated that the sealing member of the film cassette K is closed and the film cassette K with the frame-by-frame exposed film arranged therein can be removed from the camera without the danger of undesirable light penetration.

The above-described camera is generally a photographic recording or reproducing device with a transportation device for the frame-by-frame transportation of a film along a film transportation path and a film measuring device with a rotatably and displaceably mounted engagement member for engaging in a peripheral perforation of the film, the film transportation device being locked by means of a locking device when the film reaches a position during its transportation which is provided for the recording or reproduction of an image, the locking device of the measuring device preferably constructed as a lever arm 29 of a switching member 24 being controllable by a drive device 50 for a sealing member of a film cassette K inserted in the device. The locking device is controllable by the drive device 50 for the sealing member of the film cassette as a function of the control movement of a film transportation-dependent control member, preferably constructed as a control slide 61. The control slide 61 is controllable by a frame counting mechanism of the device preferably constructed as a frame counter disc 45.

With a corresponding adaptation of the film transportation device and film measuring device, the solution according to the invention can also be used in cases where the film F is transported, during withdrawal from the film cassette K, stepwise from right to left in the illustration of FIG. 1 into the film winding chamber 12 of the camera housing 1, thereby forming a loose film coil $F_w$, and during this process is exposed frame-by-frame, passing an aperture in the camera in stepwise fashion. In this case, there is subsequently a return transportation of the film F from left to right, it being possible for the rewinding into the film cassette K to take place in a single step, naturally without re-exposing the film.

Usually, in respect of the chemical and physical layer structure of the film F, a colour negative film or reversible colour film known per se is provided, optionally with an additional coating for the magnetic recording of additional data.

Alternatively, a magnetic image recording material as known in principle from video technology can be used as the film F if the camera is equipped with opto-electronic light receivers suitable for such recording.

The above-described embodiments of a photographic recording device according to the invention relate to a camera in each case. The solution according to the invention for frame-by-frame film transportation can also be used in a manner not illustrated in further detail in photographic reproducing devices, e.g. in image viewing devices and projection devices as well as in simply constructed copying devices in which there is a frame-by-frame film advancement for the reproduction of images which have preferably been recorded on a film of the above packaging type.

If an electromotor drive is provided in photographic reproducing devices of this type for the stepwise film transportation, a manually actuated switch can be provided for entering film advance commands in place of the trigger button 43 of the camera described in the above embodiments.

We claim:

1. A photographic recording or reproducing device, comprising
   (a) film transportation means for transporting film along a film transportation path, the film having edge perforations;
   (b) an engagement member mounted for movement between an engagement position in which the engagement member engages at least one of the edge perforations of the film, and a non-engagement position in which the engagement member does not engage any of the edge perforations of the film, a pivot axis pin about which the engagement member is pivotable during said movement and a sliding connection for the pivot axis pin whereby the pivot axis pin is moveable approximately parallel to the film transportation path;
   (c) locking means for locking the film transportation means upon engagement of the engagement member with at least one of the edge perforations of the film;
   (d) an actuation member mounted for displacement of the engagement member from the engaging position into the non-engaging position when the locking means releases the film transportation means; and
   (e) coupling means arranged between the engagement member and the actuation member so as to maintain the engagement member continuously coupled to the actuation member when the engagement member moves between the engagement position and the non-engagement position.

2. A device according to claim 1, wherein the coupling means is a pin-and-slot coupling comprising a slot on one of the engagement and actuation members, and a pin on the other one of the engagement and actuation members engaging the slot.

3. A device according to claim 2, wherein the engagement member and the actuation member are arranged on opposite sides of a housing plate, and the pin penetrates a slot provided in the housing plate.

4. A device according to claim 1, including photographic shutter release means connected and arranged to control the actuation member.

5. A device according to claim 4, including slide means operatively connected to the photographic shutter release means for controlling the actuation member.

6. A device according to claim 1, wherein the locking means is pivotably mounted by a shaft and the actuation member is arranged on the shaft.

7. A device according to claim 6, wherein the actuation member is connected to the locking means.

8. A device according to claim 7, wherein the film transportation means includes a film transportation wheel with a toothed rim, and wherein the locking means connected to the actuation member is formed by a lever arm engaging the toothed rim of the film transportation wheel of the film transportation means.

9. A device according to claim 8, wherein the lever arm forming the locking means is arraigned at the actuation member.

10. A device according to claim 1, including a frame counting device, and wherein the actuation member cooperates with the frame counting device.

11. A device according to claim 1, wherein the engagement member resiliently rests against the film and senses edge perforations of the film.

12. A device according to claim 1, wherein the engagement member is formed by a lever comprising at least one engagement tooth.

13. A device according to claim 12, wherein the engagement member comprises two engagement teeth mutually arranged and formed in cross-section so as to match two adjacent edge perforations of the film.

* * * * *

UNITED STATES PATENT AND TRADEMARK OFFICE
CERTIFICATE OF CORRECTION

PATENT NO.    : 5,899,590
DATED         : May 4, 1999
INVENTOR(S)   : Rolf Schröder, et al It is certified that error appears in the above-indentified patent and that said Letters Patent is hereby corrected as shown below:

Column  2, line 14, "$1 \leq i \leq n-1$" should read -- $1 \leq i \leq n-1$ --.

Column  6, line 32, delete the comma.

Column  9, line 37, "$18^1$" should read -- $18_1$ --.

Column 14, line 64, "filn" should read -- film --.

Signed and Sealed this

Ninth Day of November, 1999

Attest:

Q. TODD DICKINSON

*Attesting Officer*　　　　　*Acting Commissioner of Patents and Trademarks*